(12) United States Patent
Khosravirad et al.

(10) Patent No.: US 11,044,054 B2
(45) Date of Patent: Jun. 22, 2021

(54) AUTOMATIC RETRANSMISSION OF DAMAGED DATA IN WIRELESS NETWORKS

(71) Applicant: NOKIA TECHNOLOGIES OY, Espoo (FI)

(72) Inventors: Saeed Reza Khosravirad, Wroclaw (PL); Klaus Ingemann Pedersen, Aalborg (DK); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/472,158

(22) PCT Filed: Dec. 21, 2016

(86) PCT No.: PCT/EP2016/082182
§ 371 (c)(1),
(2) Date: Jun. 20, 2019

(87) PCT Pub. No.: WO2018/113951
PCT Pub. Date: Jun. 28, 2018

(65) Prior Publication Data
US 2019/0319750 A1  Oct. 17, 2019

(51) Int. Cl.
*H04W 4/00*  (2018.01)
*H04L 1/18*  (2006.01)
(Continued)

(52) U.S. Cl.
CPC .......... *H04L 1/1819* (2013.01); *H04L 1/0047* (2013.01); *H04L 1/0061* (2013.01); *H04L 1/0069* (2013.01); *H04L 5/0055* (2013.01)

(58) Field of Classification Search
CPC .............. H04W 72/042; H04W 76/27; H04W 72/0453; H04L 1/1819; H04L 1/0047;
(Continued)

(56) References Cited

U.S. PATENT DOCUMENTS

| 2002/0062468 A1* | 5/2002 | Nagase ............. | H03M 13/2957 714/755 |
| 2003/0088822 A1* | 5/2003 | Kim .................. | H03M 13/6362 714/790 |

(Continued)

OTHER PUBLICATIONS

3GPP TSG-RAN WG1 #87 R1-1612247 Reno, Nevada, United States, Nov. 14-18, 2016 hereinafter 3GPP (Year: 2016).*
(Continued)

*Primary Examiner* — Atique Ahmed
(74) *Attorney, Agent, or Firm* — Brake Hughes Bellermann LLP

(57) ABSTRACT

A technique may include scheduling, by a base station, a block of data for transmission to a user device, transmitting, by a base station to a user device, a data packet that includes at least a portion of the block of data, estimating, by the base station, that a reception by the user device of the data packet will be subject to errors, and pro-actively retransmitting, by the base station based on the estimating, at least a portion of the block of data without waiting for feedback from the user device regarding the data packet.

20 Claims, 10 Drawing Sheets

(51) Int. Cl.
*H04L 1/00* (2006.01)
*H04L 5/00* (2006.01)

(58) Field of Classification Search
CPC ... H04L 5/0055; H04L 1/0069; H04L 1/0061; H04L 5/0053; H04L 5/0007
See application file for complete search history.

(56) References Cited

U.S. PATENT DOCUMENTS

| | | | | |
|---|---|---|---|---|
| 2003/0097629 | A1* | 5/2003 | Moon | H04L 1/0009 714/751 |
| 2003/0147371 | A1* | 8/2003 | Choi | H04B 7/2637 370/341 |
| 2005/0013263 | A1* | 1/2005 | Kim | H04L 1/1664 370/320 |
| 2009/0265599 | A1* | 10/2009 | Chae | H04L 1/1896 714/749 |
| 2010/0091801 | A1* | 4/2010 | Itakura | H04L 1/1854 370/475 |
| 2010/0246472 | A1 | 9/2010 | Wu et al. | |
| 2016/0285479 | A1* | 9/2016 | El-Khamy | H03M 13/616 |

OTHER PUBLICATIONS

3GPP TSG-RAN WG1 #87 R1-1612247 (Year: 2016).*
International Search Report and Written Opinion for International Application No. PCT/EP2016/082182, dated Nov. 6, 2017, 21 pages.
3GPP TSG-RAN WG1 #87; R1-1612247; Agenda item: 7.1.4.4; "Punctured Scheduling for Low Latency Transmissions"; Reno, Nevada, USA; Nov. 14-18, 2016; 5 pages.
Pedersen et al.; "A Flexible Frame Structure for 5G Wide Area"; IEEE 82nd Vehicular Technology Conference (VTC2015—Fall); Sep. 6-9, 2015; Boston, MA, USA; 5 pages.

* cited by examiner

AUTOMATIC RETRANSMISSION OF DAMAGED DATA IN WIRELESS NETWORKS

CROSS-REFERENCE TO RELATED APPLICATIONS

This application is a national stage entry of International Application No. PCT/EP2016/082182, filed Dec. 21, 2016, entitled "AUTOMATIC RETRANSMISSION OF DAMAGED DATA IN WIRELESS NETWORKS" which is hereby incorporated by reference in its entirety.

TECHNICAL FIELD

This description relates to wireless communications, and in particular, to an automatic retransmission of damaged data in a wireless network

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

Many modern communication systems, including LTE, employ a combination of forward error correction coding and ARQ (automatic repeat request), known as hybrid automatic repeat request (HARQ). HARQ uses forward error correction (FEC) codes to correct a subset of errors and relies on error detection to detect uncorrectable errors. Erroneously received packets may be stored to be combined with other transmissions, and the receiver requests a retransmission of the corrupted packet(s) by sending a negative acknowledgement (NACK) to the transmitter. This is a combination of FEC and ARQ. A version of the original packet (a version of the data/payload in the original packet) is then retransmitted, and the receiver may combine multiple received versions of the packet/payload. The receiver may also send an acknowledgement (ACK) for correctly received (decoded) packets. HARQ feedback may include either an ACK or a NACK.

SUMMARY

According to an example implementation, a method may include scheduling, by a base station, a block of data for transmission to a user device, transmitting, by a base station to a user device, a data packet that includes at least a portion of the block of data, estimating, by the base station, that a reception by the user device of the data packet will be subject to errors, and pro-actively retransmitting, by the base station based on the estimating, at least a portion of the block of data without waiting for feedback from the user device regarding the data packet.

According to an example implementation, an apparatus includes at least one processor and at least one memory including computer instructions, when executed by the at least one processor, cause the apparatus to: schedule, by a base station, a block of data for transmission to a user device, transmit, by a base station to a user device, a data packet that includes at least a portion of the block of data, estimate, by the base station, that a reception by the user device of the data packet will be subject to errors, and pro-actively retransmit, by the base station based on the estimating, at least a portion of the block of data without waiting for feedback from the user device regarding the data packet.

According to an example implementation, an apparatus includes means for scheduling, by a base station, a block of data for transmission to a user device, means for transmitting, by a base station to a user device, a data packet that includes at least a portion of the block of data, means for estimating, by the base station, that a reception by the user device of the data packet will be subject to errors, and means for pro-actively retransmitting, by the base station based on the estimating, at least a portion of the block of data without waiting for feedback from the user device regarding the data packet.

According to an example implementation, a computer program product includes a computer-readable storage medium and storing executable code that, when executed by at least one data processing apparatus, is configured to cause the at least one data processing apparatus to perform a method including: scheduling, by a base station, a block of data for transmission to a user device, transmitting, by a base station to a user device, a data packet that includes at least a portion of the block of data, estimating, by the base station, that a reception by the user device of the data packet will be subject to errors, and pro-actively retransmitting, by the base station based on the estimating, at least a portion of the block of data without waiting for feedback from the user device regarding the data packet.

According to an example implementation, a method may include scheduling a transmission of a block of data for a first user device, puncturing a plurality of bits of the block of data for the first user device, transmitting a data packet including the block of data where the plurality of bits have been punctured, and pro-actively transmitting, by the base station to the first user device, at least the punctured plurality of bits, regardless whether feedback has been received from the user device regarding the data packet.

According to an example implementation, an apparatus includes at least one processor and at least one memory including computer instructions, when executed by the at least one processor, cause the apparatus to: schedule a transmission of a block of data for a first user device, puncture a plurality of bits of the block of data for the first user device, transmit a data packet including the block of data where the plurality of bits have been punctured, and pro-actively transmit, by the base station to the first user device, at least the punctured plurality of bits, regardless whether feedback has been received from the user device regarding the data packet.

According to an example implementation, an apparatus includes means for scheduling a transmission of a block of data for a first user device, means for puncturing a plurality of bits of the block of data for the first user device, means for transmitting a data packet including the block of data where the plurality of bits have been punctured, and means for pro-actively transmitting, by the base station to the first user device, at least the punctured plurality of bits, regardless whether feedback has been received from the user device regarding the data packet.

According to an example implementation, a computer program product includes a computer-readable storage medium and storing executable code that, when executed by at least one data processing apparatus, is configured to cause the at least one data processing apparatus to perform a method including: scheduling a transmission of a block of data for a first user device, puncturing a plurality of bits of the block of data for the first user device, transmitting a data packet including the block of data where the plurality of bits have been punctured, and pro-actively transmitting, by the base station to the first user device, at least the punctured plurality of bits, regardless whether feedback has been received from the user device regarding the data packet.

According to an example implementation, a method may include receiving, by a first user device from a base station, a first data packet wherein a plurality of bits have been punctured, receiving, by the first user device from the base station, information that indicates which bits have been punctured, receiving, by the first user device, a second data packet that includes at least the punctured plurality of bits, determining, by the user device, a combined block of data by combining the punctured plurality of bits received via the second data packet with at least a portion of the first data packet, and decoding, by the first user device, the combined block of data.

According to an example implementation, an apparatus includes at least one processor and at least one memory including computer instructions, when executed by the at least one processor, cause the apparatus to: receive, by a first user device from a base station, a first data packet wherein a plurality of bits have been punctured, receive, by the first user device from the base station, information that indicates which bits have been punctured, receive, by the first user device, a second data packet that includes at least the punctured plurality of bits, determining, by the user device, a combined block of data by combining the punctured plurality of bits received via the second data packet with at least a portion of the first data packet, and decoding, by the first user device, the combined block of data.

According to an example implementation, an apparatus includes means for receiving, by a first user device from a base station, a first data packet wherein a plurality of bits have been punctured, means for receiving, by the first user device from the base station, information that indicates which bits have been punctured, means for receiving, by the first user device, a second data packet that includes at least the punctured plurality of bits, means for determining, by the user device, a combined block of data by combining the punctured plurality of bits received via the second data packet with at least a portion of the first data packet, and means for decoding, by the first user device, the combined block of data.

According to an example implementation, a computer program product includes a computer-readable storage medium and storing executable code that, when executed by at least one data processing apparatus, is configured to cause the at least one data processing apparatus to perform a method including: receiving, by a first user device from a base station, a first data packet wherein a plurality of bits have been punctured, receiving, by the first user device from the base station, information that indicates which bits have been punctured, receiving, by the first user device, a second data packet that includes at least the punctured plurality of bits, determining, by the user device, a combined block of data by combining the punctured plurality of bits received via the second data packet with at least a portion of the first data packet, and decoding, by the first user device, the combined block of data.

The details of one or more examples of implementations are set forth in the accompanying drawings and the description below. Other features will be apparent from the description and drawings, and from the claims.

DETAILED DESCRIPTION

Figure 1:
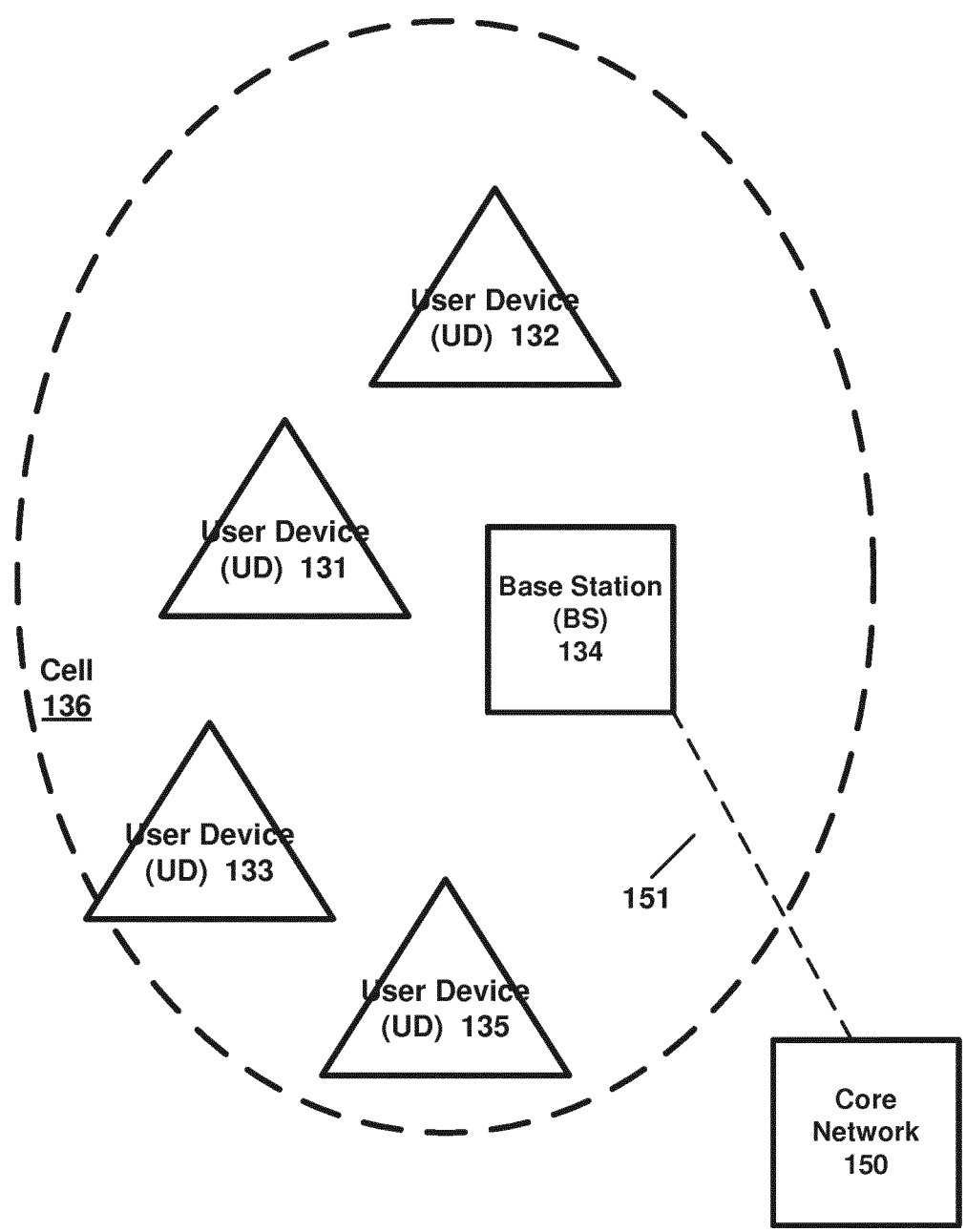
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e) Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, LTE-A Pro, 5G, cmWave, and/or mmWave band networks, or any other wireless network. LTE, 5G, cmWave and mmWave band networks are provided only as illustrative examples, and the various example implementations may be applied to any wireless technology/wireless network.

According to an example implementation, the wireless network in FIG. 1 may employ a combination of forward error correction coding and ARQ (automatic repeat request), referred to as hybrid ARQ (HARQ). With such an approach, for example for data transmission in the downlink direction, BS 134 (as an example transmitter) may transmit a packet or data block to user device 132, for example. User device 132 (as an example receiver) may use forward error correction (FEC) codes to correct errors in the received data block, where possible. User device 132 may use error detection to detect uncorrectable errors. If the received data block cannot be decoded by user device 132 due to errors, user device 132 may send a negative acknowledgement (NACK) for the packet to the BS 134. In response to receiving the NACK, BS 134 may resend (retransmit) the data packet, e.g., the data block or packet payload or a redundancy version of the data block to the user device 132. User device 132 may combine multiple received versions of the data block to decode the data block, which may sometimes be referred to as soft combining, by way of illustrative example. One or more retransmissions of data may be a same or a different redundancy version of the data, for example. User device 132 may then send an acknowledgement (ACK) for the packet to BS 134 to acknowledge that the data block was received and decoded. A similar process may be followed for uplink data transmission, where the user device 132 may send data to the BS 134. The ACK/NACK feedback may be referred to as HARQ feedback.

According to an example implementation, a base station (BS) may schedule a block of data (or data block) for transmission, and then may transmit a data packet including at least a portion of the block of data to a user device. The BS may estimate (or may determine) that a reception of the data packet by the user device will (e.g., will likely) be subject to errors at the user device when the user device attempts to receive and decode the data packet. Rather than waiting for the (likely) negative acknowledgement (NACK) from the user device regarding the data packet, the BS may pro-actively (that is, without waiting for feedback or a NACK from the user device regarding the transmitted packet, and/or without waiting for expiration of a retransmission timer) retransmit at least a portion of the block of data. In this manner, when the BS estimates or determines that the received data packet will be subject to errors (e.g., which may likely prevent decoding of the data packet), the BS may pro-actively retransmit at least a portion of the data block, without waiting for feedback (e.g., a NACK) or expiration of a retransmission timer. In this manner, delays or latency for transmission of data may be decreased.

According to an example implementation, the data packet may be subject to errors at the user device based on one or more situations or examples that may arise, such as, for example, a decreased channel quality, an increased channel interference, and/or puncturing of a plurality of bits of the data block. For example: 1) a BS may receive a first channel quality indication (CQI) report, and then, on the basis of this first CQI report, the BS may schedule a block of data for transmission (e.g., which may include using a specific modulation and coding scheme) to the user device. And, near or shortly before or shortly after the time the block of data is actually transmitted in a data packet, the BS may receive a second (updated) CQI report indicating that channel quality between the BS and the user device has worsened in channel quality (lower channel quality) that now makes it unlikely (or at least less likely), for example, that the data packet will be successfully decoded at the user device; 2) shortly before, near or shortly after transmission of the data packet, the BS receives information indicating presence of (or an increase in) interference from other BSs and/or other user devices that makes it unlikely (or at least less likely), for example, that the data packet will be successfully decoded at the user device; and/or 3) the BS schedules a block of data for transmission to user device A (or UE_A), but then receives some higher priority data for user device B (UE_B), and the BS then punctures (e.g., deletes or removes) a plurality of bits of the block of data for user device A, and replaces the punctured bits of the block of data with higher priority bits for user device B. These punctured bits (or portion of the data that was scheduled for transmission to user device A, but not actually sent in the data packet) have been deleted or removed from packet, and replaced with higher priority data, according to this illustrative example. For example, if the number or amount of punctured bits is greater than a threshold, then this may prevent the user device A from successfully decoding the data packet or block of data.

Hence, regardless whether the errors at the user device were caused by a change in a channel condition or interference, or a puncturing of a data block that is transmitted, the BS may know or determine (e.g., without waiting for a NACK or expiration of a retransmission timer) that the user device will (likely) be unable to decode the data, and the BS may then pro-actively retransmit, e.g., during a next HARQ retransmission time, all or part of the block of data (e.g., retransmit only the punctured bits, or retransmit the entire block of data including the punctured bits, for example). The user device may, for example, then combine both the originally transmitted block of data and the retransmitted punctured bits (or retransmitted block of data that includes the punctured bits) for decoding. Also, according to an example implementation, the BS may send to the user device a puncturing pattern or other information that may indicate the bits that were punctured. In this manner, network latency may be reduced, due to the pro-active transmission or retransmission of data without waiting for feedback (e.g., without waiting for a NACK from the user device, and/or without waiting for a retransmission timer).

Figure 2:
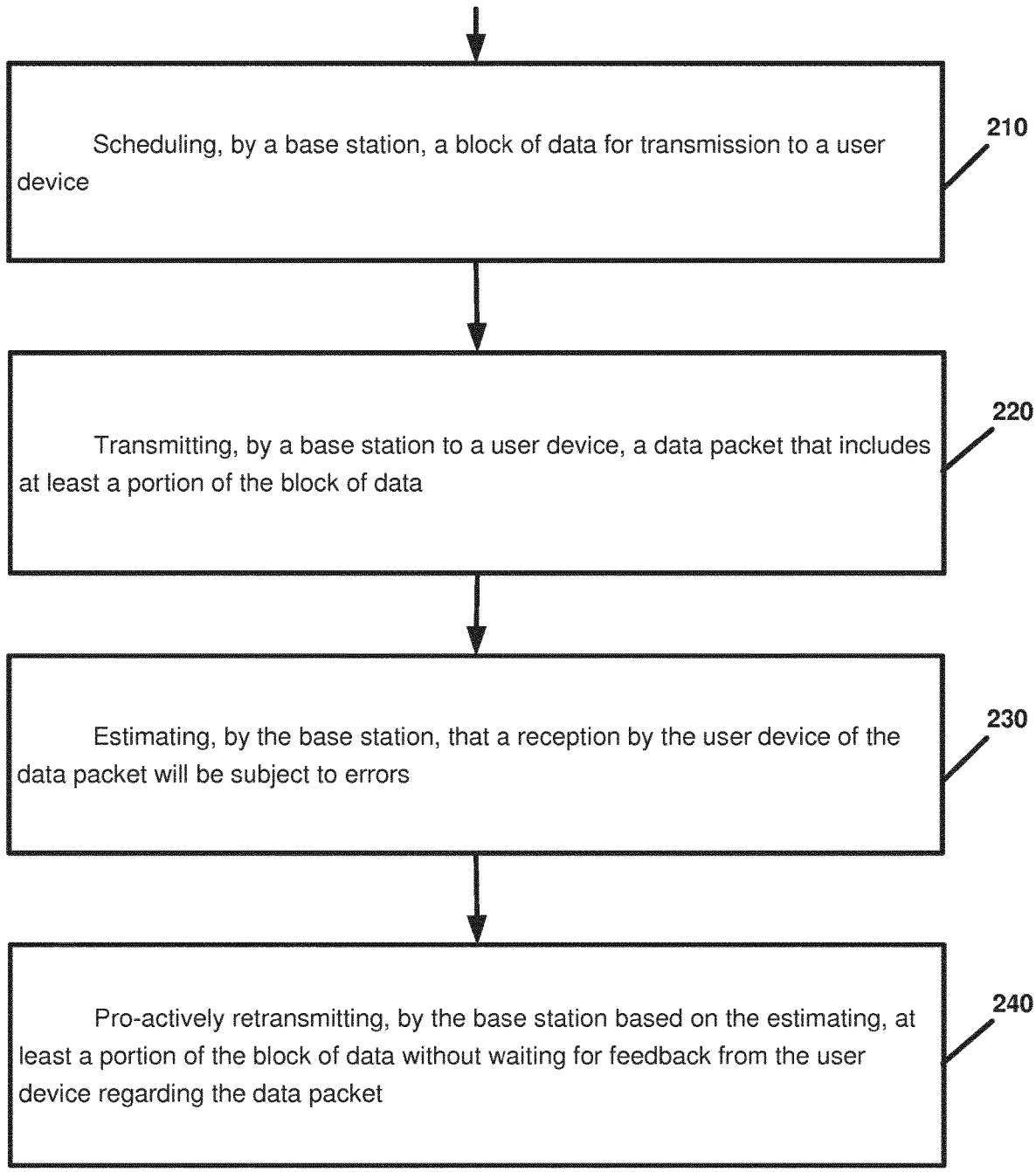
FIG. 2 is a flow chart illustrating operation of a base station according to an example implementation.

FIG. 2 is a flow chart illustrating operation of a base station according to an example implementation. Operation 210 includes scheduling, by a base station, a block of data for transmission to a user device. Operation 220 includes transmitting, by a base station to a user device, a data packet that includes at least a portion of the block of data. Operation 230 includes estimating, by the base station, that a reception by the user device of the data packet will be subject to errors. And, operation 240 includes pro-actively retransmitting, by the base station based on the estimating, at least a portion of the block of data without waiting for feedback from the user device regarding the data packet.

According to an example implementation of the method of FIG. 2, the estimating may include: determining a change in a channel condition or an interference level of a channel between the base station and the user device that makes it likely that errors will occur at the user device when the user device attempts to decode the data packet.

According to an example implementation of the method of FIG. 2, the estimating may include: puncturing at least a portion of the block of data that is transmitted in the data packet.

According to an example implementation of the method of FIG. 2, the estimating may include: puncturing at least a portion of the block of data; and replacing the punctured portion of block of data with data that is a higher priority than the punctured portion.

According to an example implementation of the method of FIG. 2, the pro-actively retransmitting may include: pro-actively retransmitting, by the base station, at least a portion of the block of data without waiting for feedback and regardless whether feedback has been received from the user device regarding the data packet.

According to an example implementation of the method of FIG. 2, the pro-actively retransmitting may include: pro-actively retransmitting, by the base station, only a portion of the block of data without waiting for feedback and regardless whether feedback has been received from the user device regarding the data packet.

According to an example implementation of the method of FIG. 2, and further including providing, by the base station to the user device, an indication of the portion of the block of data that is pro-actively retransmitted.

According to an example implementation of the method of FIG. 2, the pro-actively retransmitting may include: determining whether the punctured portion of the block of data is greater than or equal to a threshold; pro-actively retransmitting the entire block of data if the punctured portion of the block of data is greater than or equal to the threshold; otherwise, pro-actively retransmitting only the punctured portion of the block of data if the punctured portion of the block of data is not greater than or equal to the threshold.

According to an example implementation of the method of FIG. 2, the pro-actively retransmitting may include: pro-actively retransmitting, by the base station, at least a portion of the block of data before processing a hybrid ARQ (HARQ) acknowledgement (ACK) or negative acknowledgement (NACK) from the user device regarding the data packet.

According to an example implementation of the method of FIG. 2, the pro-actively retransmitting may include: pro-actively retransmitting, by the base station, at least a portion of the block of data before the user device has decoded the data packet.

Figure 3:
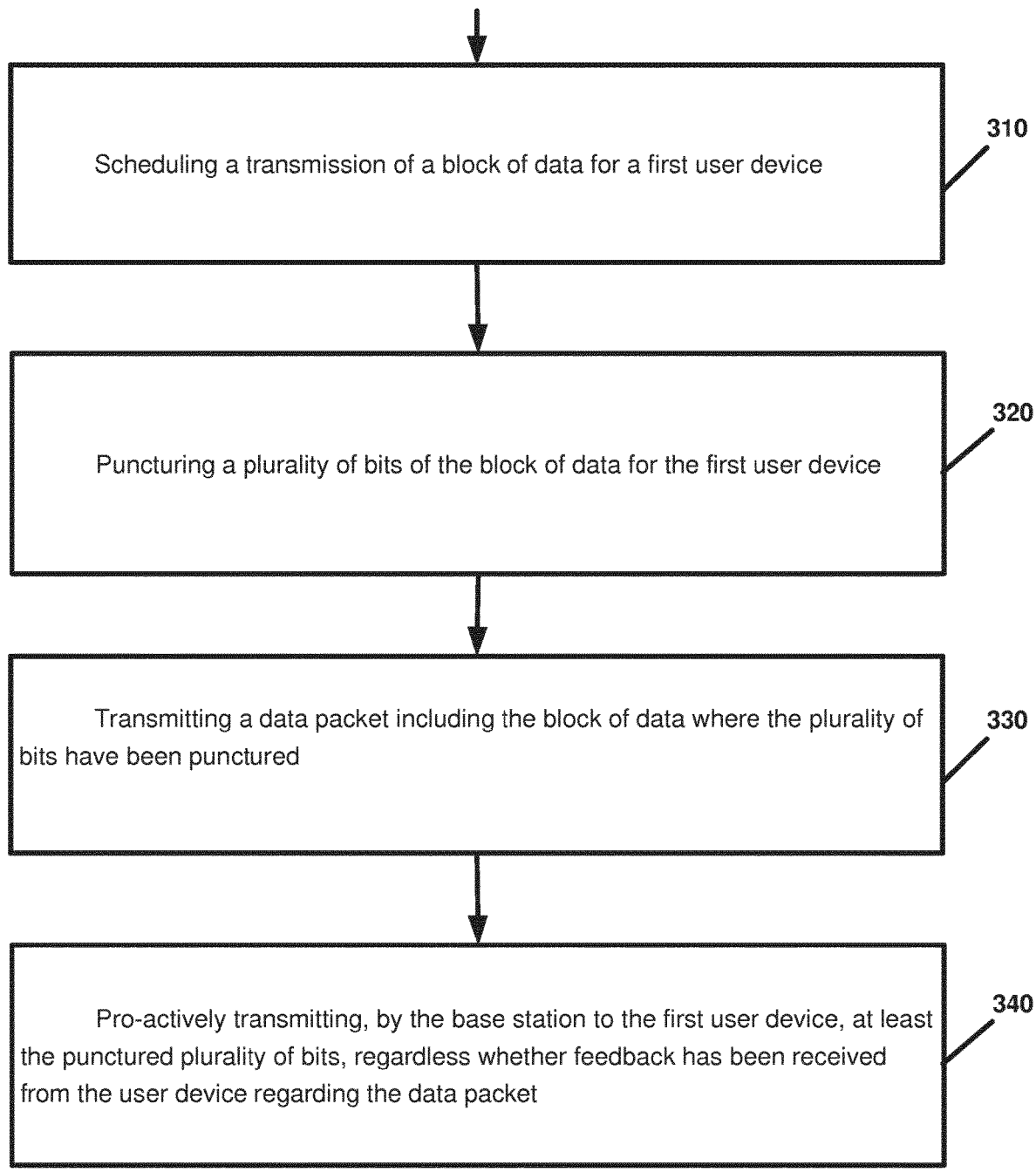
FIG. 3 is a flow chart illustrating operation of a base station according to another example implementation.

FIG. 3 is a flow chart illustrating operation of a base station according to another example implementation. Operation 310 includes scheduling a transmission of a block of data for a first user device. Operation 320 includes puncturing a plurality of bits of the block of data for the first user device. Operation 330 includes transmitting a data packet including the block of data where the plurality of bits have been punctured. And, operation 340 includes pro-actively transmitting, by the base station to the first user device, at least the punctured plurality of bits, regardless whether feedback has been received from the user device regarding the data packet.

According to an example implementation, an apparatus includes at least one processor and at least one memory including computer instructions, when executed by the at least one processor, cause the apparatus to: schedule, by a base station, a block of data for transmission to a user device, transmit, by a base station to a user device, a data packet that includes at least a portion of the block of data, estimate, by the base station, that a reception by the user device of the data packet will be subject to errors, and pro-actively retransmit, by the base station based on the estimating, at least a portion of the block of data without waiting for feedback from the user device regarding the data packet.

According to an example implementation, an apparatus includes means for scheduling, by a base station, a block of data for transmission to a user device, means for transmitting, by a base station to a user device, a data packet that includes at least a portion of the block of data, means for estimating, by the base station, that a reception by the user device of the data packet will be subject to errors, and means for pro-actively retransmitting, by the base station based on the estimating, at least a portion of the block of data without waiting for feedback from the user device regarding the data packet.

According to an example implementation, a computer program product includes a computer-readable storage medium and storing executable code that, when executed by at least one data processing apparatus, is configured to cause the at least one data processing apparatus to perform a method including: scheduling, by a base station, a block of data for transmission to a user device, transmitting, by a base station to a user device, a data packet that includes at least a portion of the block of data, estimating, by the base station, that a reception by the user device of the data packet will be subject to errors, and pro-actively retransmitting, by the base station based on the estimating, at least a portion of the block of data without waiting for feedback from the user device regarding the data packet.

According to an example implementation of the method of FIG. 3, and further including determining a plurality of bits to be transmitted to a second user device; replacing, in the block of data, the punctured plurality of bits with the plurality of bits for the second user device; and, wherein the pro-actively transmitting comprises pro-actively transmitting, by the base station to the first user device, at least the punctured plurality of bits, without waiting for feedback and regardless whether feedback has been received from the user device regarding the data packet.

According to an example implementation of the method of FIG. 3, the pro-actively transmitting may include: pro-actively transmitting, by the base station to the first user device during a next hybrid ARQ (HARQ) retransmission time, at least the punctured plurality of bits and including a puncturing pattern to indicate which bits were previously punctured.

According to an example implementation of the method of FIG. 3, the plurality of bits for the second user device are more urgent or a higher priority than the data for the first user device.

According to an example implementation of the method of FIG. 3, the first data packet may include a first data packet, wherein the pro-actively transmitting may include: pro-actively transmitting, by the base station to the first user device, a second data packet including the scheduled block of data for the first user device that includes the punctured plurality of bits, without waiting for feedback and regardless whether feedback has been received from the first user device regarding the first data packet.

According to an example implementation of the method of FIG. 3, the data packet may include a first data packet, and wherein the pro-actively transmitting may include: determining whether the plurality of punctured bits is greater than a threshold; pro-actively transmitting, by the base station to the first user device during a subsequent hybrid ARQ (HARQ) retransmission time, only the punctured plurality bits if the punctured plurality of bits are not greater than the threshold, without waiting for feedback and regardless whether feedback has been received from the first user device regarding the first data packet; and otherwise, if the punctured plurality of bits are greater than the threshold, then pro-actively transmitting, by the base station to the first user device, a second data packet including the scheduled block of data for the first user device that includes the punctured plurality of bits, without waiting for feedback and regardless whether feedback has been received from the first user device regarding the first data packet.

According to an example implementation, an apparatus includes at least one processor and at least one memory including computer instructions, when executed by the at least one processor, cause the apparatus to: schedule a transmission of a block of data for a first user device, puncture a plurality of bits of the block of data for the first user device, transmit a data packet including the block of data where the plurality of bits have been punctured, and pro-actively transmit, by the base station to the first user device, at least the punctured plurality of bits, regardless whether feedback has been received from the user device regarding the data packet.

According to an example implementation, an apparatus includes means for scheduling a transmission of a block of data for a first user device, means for puncturing a plurality of bits of the block of data for the first user device, means for transmitting a data packet including the block of data where the plurality of bits have been punctured, and means for pro-actively transmitting, by the base station to the first user device, at least the punctured plurality of bits, regardless whether feedback has been received from the user device regarding the data packet.

According to an example implementation, a computer program product includes a computer-readable storage medium and storing executable code that, when executed by at least one data processing apparatus, is configured to cause the at least one data processing apparatus to perform a method including: scheduling a transmission of a block of data for a first user device, puncturing a plurality of bits of the block of data for the first user device, transmitting a data packet including the block of data where the plurality of bits have been punctured, and pro-actively transmitting, by the base station to the first user device, at least the punctured plurality of bits, regardless whether feedback has been received from the user device regarding the data packet.

Figure 4:
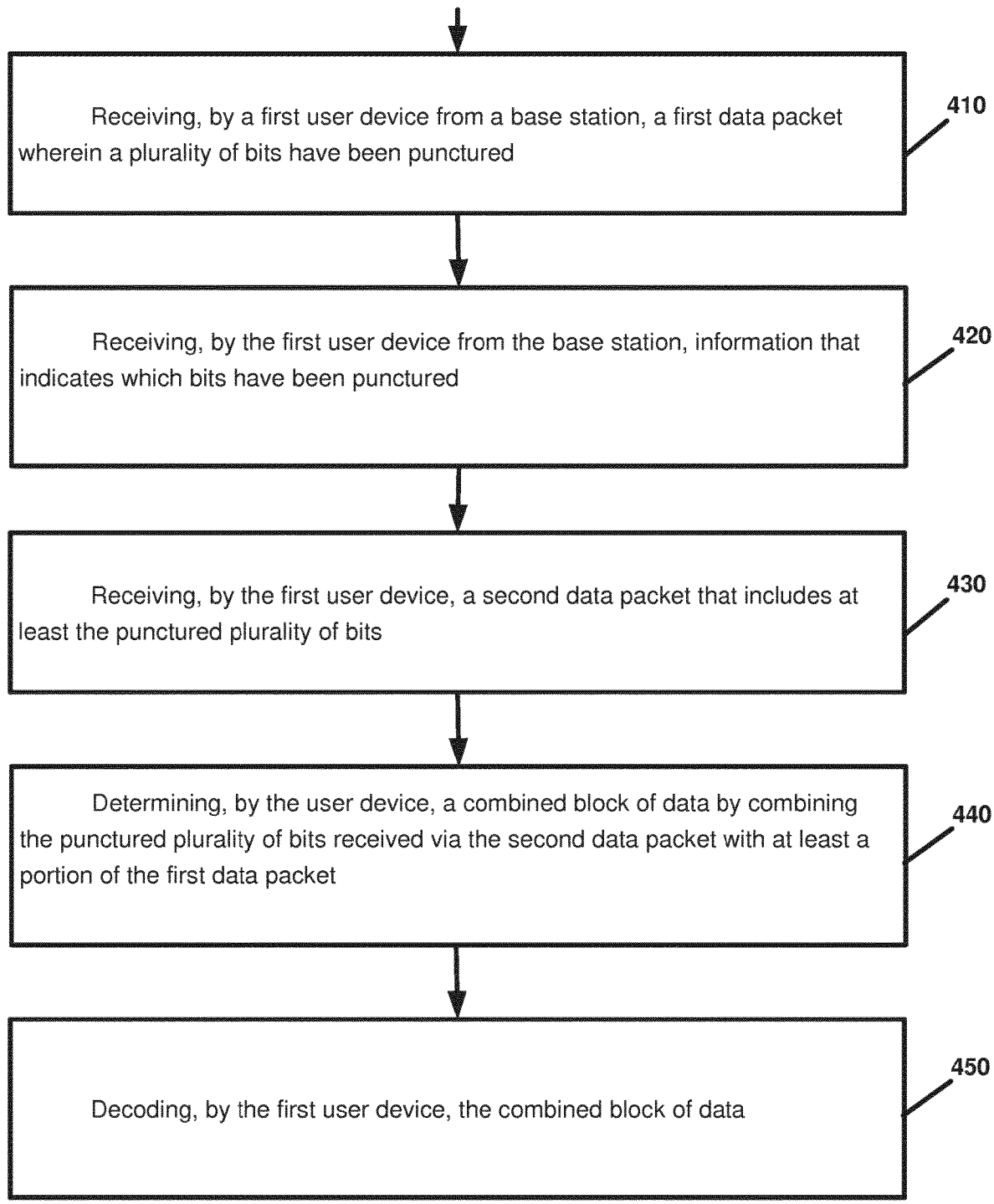
FIG. 4 is a flow chart illustrating operation of a user device according to another example implementation.

FIG. 4 is a flow chart illustrating operation of a user device according to another example implementation. Operation 410 includes receiving, by a first user device from a base station, a first data packet wherein a plurality of bits have been punctured. Operation 420 includes receiving, by the first user device from the base station, information that indicates which bits have been punctured. Operation 430 includes receiving, by the first user device, a second data packet that includes at least the punctured plurality of bits. Operation 440 includes determining, by the user device, a combined block of data by combining the punctured plurality of bits received via the second data packet with at least a portion of the first data packet. Operation 450 includes decoding, by the first user device, the combined block of data.

According to an example implementation of the method of FIG. 4, the receiving a first data packet may include receiving, by a first user device from a base station, a first data packet wherein a plurality of bits have been punctured and replaced with higher priority bits for a second user device.

According to an example implementation of the method of FIG. 4, the second data packet including the plurality of punctured data bits are received via a priority hybrid ARQ (HARQ) retransmission for the transmission of previously punctured bits.

According to an example implementation, an apparatus includes at least one processor and at least one memory including computer instructions, when executed by the at least one processor, cause the apparatus to: receive, by a first user device from a base station, a first data packet wherein a plurality of bits have been punctured, receive, by the first user device from the base station, information that indicates which bits have been punctured, receive, by the first user device, a second data packet that includes at least the punctured plurality of bits, determining, by the user device, a combined block of data by combining the punctured plurality of bits received via the second data packet with at least a portion of the first data packet, and decoding, by the first user device, the combined block of data.

According to an example implementation, an apparatus includes means for receiving, by a first user device from a base station, a first data packet wherein a plurality of bits have been punctured, means for receiving, by the first user device from the base station, information that indicates which bits have been punctured, means for receiving, by the first user device, a second data packet that includes at least the punctured plurality of bits, means for determining, by the user device, a combined block of data by combining the punctured plurality of bits received via the second data packet with at least a portion of the first data packet, and means for decoding, by the first user device, the combined block of data.

According to an example implementation, a computer program product includes a computer-readable storage medium and storing executable code that, when executed by at least one data processing apparatus, is configured to cause the at least one data processing apparatus to perform a method including: receiving, by a first user device from a base station, a first data packet wherein a plurality of bits have been punctured, receiving, by the first user device from the base station, information that indicates which bits have been punctured, receiving, by the first user device, a second data packet that includes at least the punctured plurality of bits, determining, by the user device, a combined block of data by combining the punctured plurality of bits received via the second data packet with at least a portion of the first data packet, and decoding, by the first user device, the combined block of data.

Various additional example implementations will be described. Example implementations may relate to scheduling priority for previously scheduled but damaged data over a radio interface in any mobile or wireless communication. For example, when a data packet for a user with critical latency requirement arrives at a BS, such a high priority data should be scheduled immediately over the radio resources (e.g., over the subframe). However, if the radio interface of the BS is already occupied with an ongoing transmission for another user, then the BS scheduler may, for example, puncture (or drop or delete) at least a portion of the ongoing transmission and re-schedule part of the resources to the newly arrived high priority data. In a separate scenario, if a too optimistic channel condition is assumed when scheduling a transmission, or if channel conditions have changed, this different or worsening channel condition can cause damage or errors to data transmission and lead to decoding failure at the user device. Hence, according to an example implementation, techniques are provided to quickly recover transmissions at the user device that have been partly punctured by other high priority (latency critical) transmissions, by way of illustrative example.

According to an example implementation, a wireless system may include a shared channel per cell. The BS packet scheduler, provided on or within the BS, is in charge of scheduling the users/user devices on the shared channel. For 5G, for example, users/user devices can be scheduled with different transmission time intervals (TTIs). The scheduler for 5G may also be able to efficiently multiplex and prioritize users with highly diverse service requirements; e.g., mobile broadband (MBB) users (e.g., having lower priority or allowing higher latency) and mission critical communication (MCC) (e.g., having higher priority and/or lower latency requirements than MBB data). In this context, MBB is often best scheduled with longer TTIs (for less relative overhead), while MCC is best scheduled with shorter TTIs, calling for immediate scheduling to fulfil the stricter latency requirements for such users/user devices.

According to an illustrative example implementation, a problem or situation may arise when one user's (UE_A) allocated symbols over the radio interface in the downlink (DL), is punctured with "critical" higher priority data transmission for another user (named as UE_B). For example, UE_A may be a MBB user device. The BS may be scheduling and transmitting DL data to UE_A (as MBB data), when MCC data (with MCC data having critical latency or low latency requirement in this example) suddenly arrives at the BS for immediate scheduling towards UE_B. UE_A may be referred to as the victim user in this case, since originally scheduled/allocated resources for UE_A are punctured (i.e., stolen) from this user, and given or scheduled for UE_B. In this case, the ongoing scheduling of data to UE_A will be partly or completely lost depending on the puncturing size. This will reduce the chances of successful decoding for UE_A. Furthermore, in some cases, UE_A may be unaware of its scheduled transmission being punctured by the transmission of data to UE_B, and UE_A will follow normal HARQ feed-back procedures for generating and sending to BS either an acknowledgement (ACK) (if data is successfully decoded) or a negative acknowledgement (NACK) if data sent to UE_A is not successfully decoded (e.g., in the case of damaged or corrupted data packet). Thus, for example, based on the puncturing of bits in the scheduled data, this may typically increase the block error rate (BLER) for UE_A, and therefore increased probability that UE_A will fail to correctly decode the transmission, and therefore requesting a retransmission by reporting a negative acknowledgement (NACK) to the BS. This will typically result in more HARQ retransmissions for the users that have their transmissions punctured, and therefore, result in higher latency. Some example techniques are described that may reduce latency due to this type of problem. For example, the BS may take advantage of its knowledge that an ongoing transmission for UE_A has been punctured by the BS scheduler, e.g., even before the victim user (e.g., UE_A) is capable of detecting the damaged data or punctured data (e.g., through a failed decoding at UE_A of the received data packet). Thus, for example, an example solution is described that may include a fast automatic or pro-active retransmission of the punctured data to the victim user device, e.g., without waiting for a NACK from the victim user device or waiting for a retransmission timer at the BS to expire (for failure to receive an ACK for such data packet that was punctured). Thus, in a example implementation, the BS may, for example, take immediate pro-active actions to retransmit the (punctured) data to the victim user device as soon as possible, e.g., even before the victim user device has completed decoding of the scheduled transmission, or before the BS has received and/or processed feedback (e.g., a NACK) from the user device for the data packet that was punctured, as some illustrative example implementations.

Thus, in an example implementation, a framework is provided for performing automatic or pro-active retransmission for user devices that are evaluated to have damaged data, estimated to have data that is subject to errors, and/or to be suffering from unexpected negative changes to the radio resources used for scheduling. In one illustrative example implementation, a UE's (UE_A) resources that were scheduled in the downlink undergoes a puncturing by a transmission for another UE (UE_B). According to an example implementation, an automatic or pro-active retransmission provides the punctured parts of UE_A's data (or the full data/data block, including punctured part, in case of having available resources in the DL).

In another embodiment of the invention, the BS will be able to detect (for instance through received CQI/CSI reports) that the channel conditions assumed when scheduling UE_A, are no longer valid and the transmission of the original packet will most likely fail. Here, the BS could have benefits from scheduling the retransmission early, e.g., rather than waiting to receive a NACK from the UE_A. The main difference between the two example implementations is how the BS becomes aware of the poor conditions for the initial radio transmission/reception (or how the BS estimates or determines that the reception of the data packet by the UE_A will be subject to errors, e.g., either via change in channel condition or interference, or by the BS puncturing the data for UE_A, such as to allocate some of the resources of the data packet for a higher priority data transmission).

The automatic retransmission for both above scenarios can happen as soon as a scheduling can take place by the scheduler for UE_A, meaning the immediate next scheduling incident (e.g., next TTI, or next subframe, or next HARQ transmission time, next opportunity to transmit a data packet or block of data), and until before HARQ retransmission for the same packet will take place (after feedback for this packet is received in the UL). In the rare case that all the available radio resources until before HARQ retransmission for UE_A will be scheduled for higher priority users, then the automatic retransmission will be replaced by a normal HARQ retransmission.

Figure 5A:
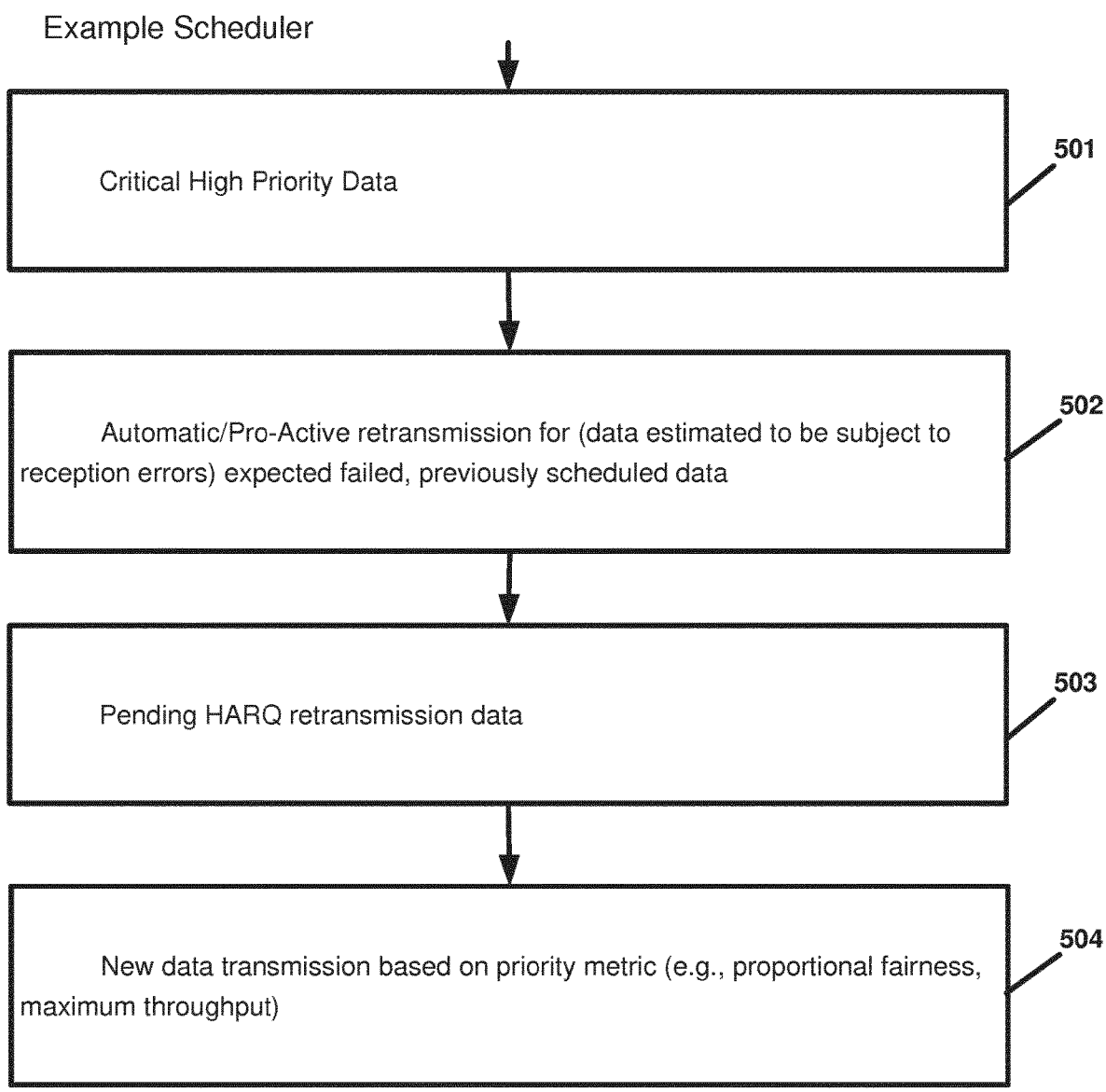
FIG. 5A illustrates scheduling priority for a transmission scheduler according to an example implementation.

FIG. 5A illustrates scheduling priority for a transmission scheduler according to an example implementation. First, the scheduler of FIG. 5A schedules critical high priority data at 501 (e.g., UE_B data in the example above). Next, at 502, the scheduler may schedule automatic or pro-active retransmission for expected failed, previously scheduled data. Scheduling step 502 is dedicated to scheduling "damaged data", or failed data, which in one example implementation, may be previously-scheduled-but-punctured data, and in the other example implementation, may be too-optimistically-scheduled data, and this scheduling step may be provided right after scheduling critical high priority data. At 503, the scheduler next schedules pending HARQ retransmission data. Finally, at 504, the scheduler schedules new data transmissions based on one or more priority metrics (e.g., proportional fairness, maximum throughput, . . . ).

Figure 5B:
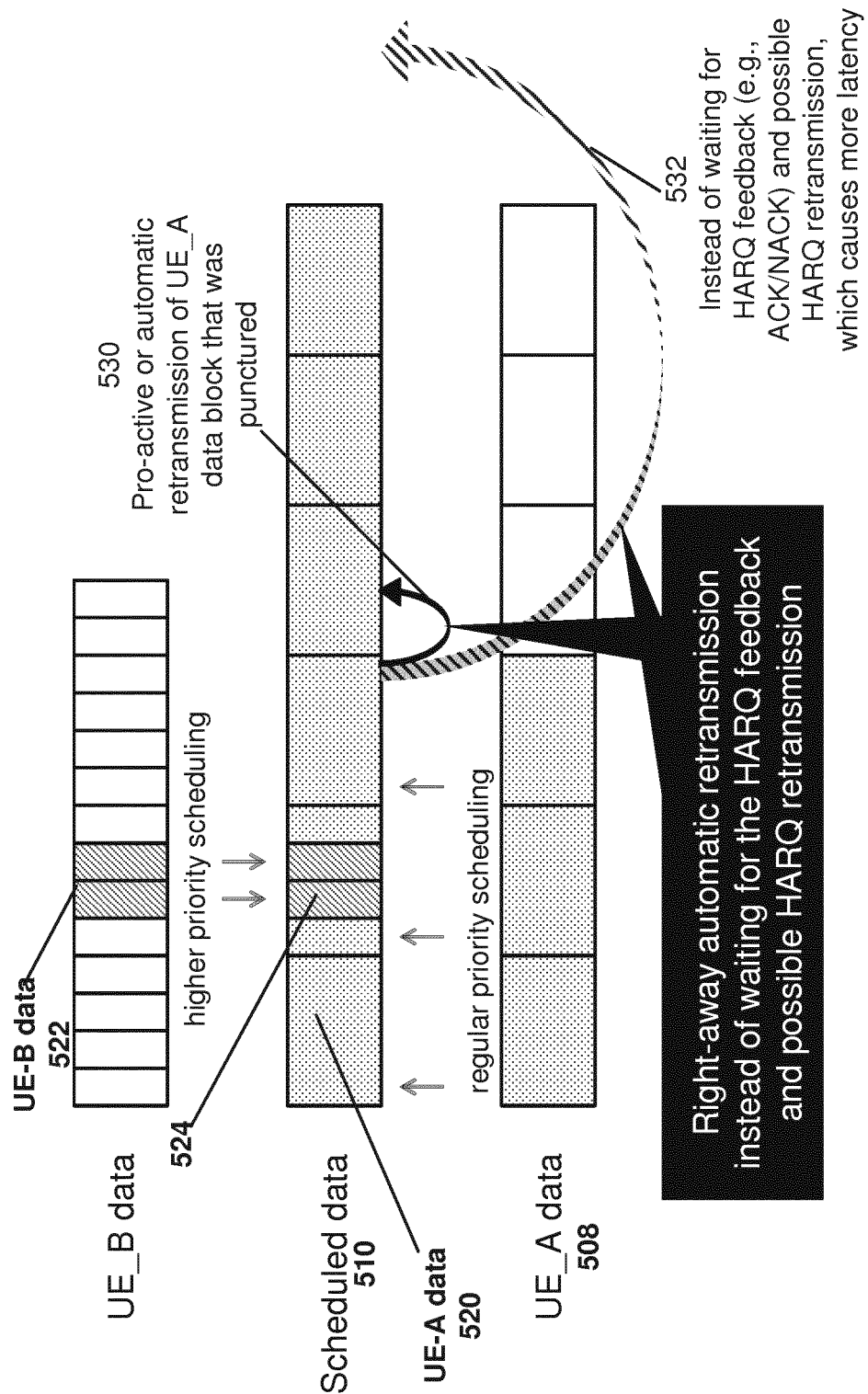
FIG. 5B is a diagram illustrating a pro-active retransmission of a data block that was damaged or subject to errors, such as by puncturing, according to an example implementation.
Figure 6:
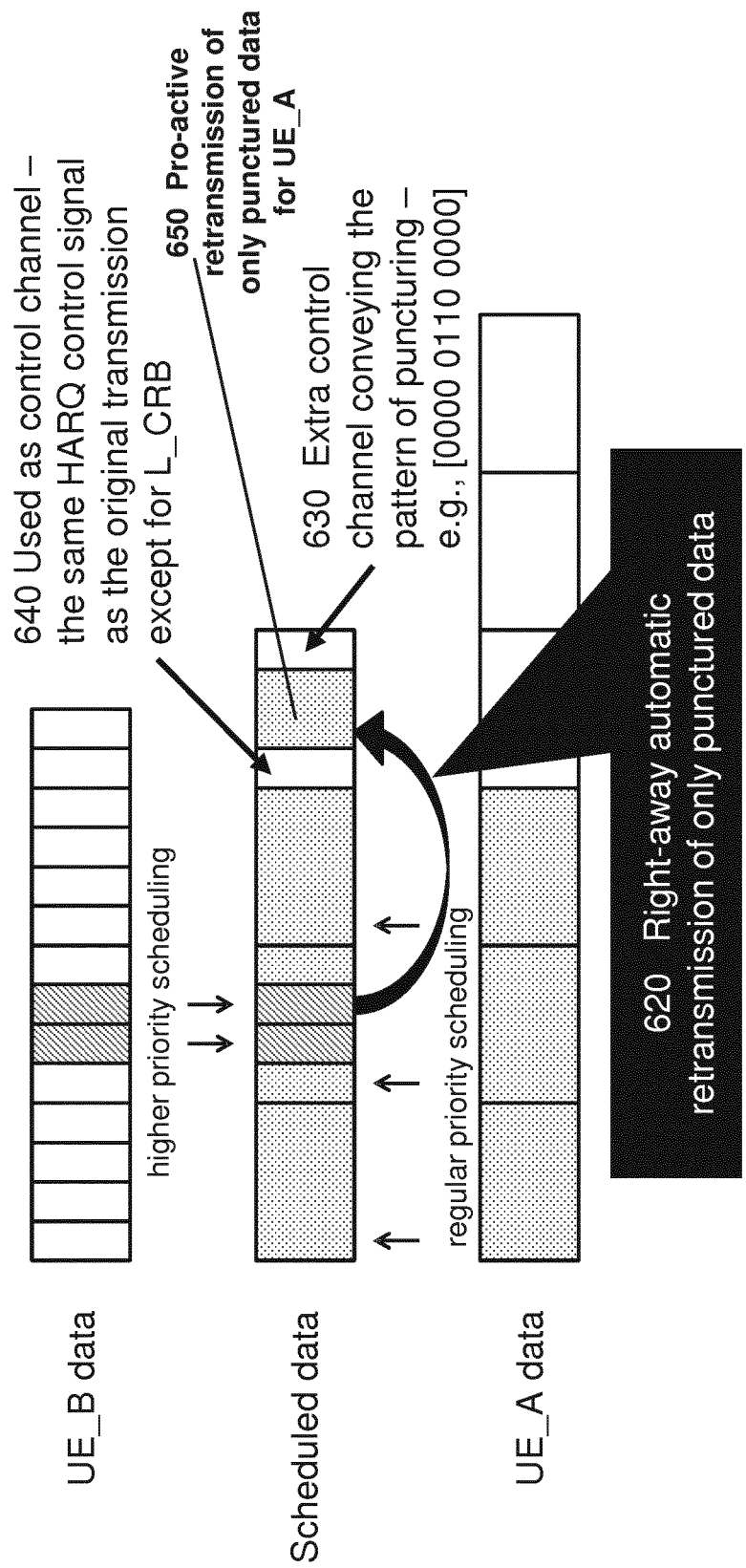
FIG. 6 is a diagram illustrating a pro-active retransmission of only punctured data according to an example implementation.

The result of including the step 502 to the scheduling flowchart, will be scheduling the punctured data in the first immediate scheduling instance where there is radio resources available more than needed for critical high priority data. The automatic retransmission can follow two different approaches, including 1) pro-active retransmission of a full data or full data block that was punctured, or 2) a pro-active retransmission of only punctured data. FIG. 5B is a diagram illustrating a pro-active retransmission of a data block that was damaged or subject to errors, such as by puncturing, according to an example implementation. FIG. 6 is a diagram illustrating a pro-active retransmission of only punctured data according to an example implementation.

In the first approach (see FIG. 5B), the original data transmission (e.g., full scheduled data block that was punctured to accommodate higher priority data) will be fully repeated/retransmitted in the pro-active retransmission (and will include the punctured data bits). This is depicted in FIG. 5B as an example of the case where right after the punctured data transmission for UE_A ends, resources are available for automatic retransmission of the entire scheduled block of data for UE_A that was punctured. Scheduler in this case, pulls the punctured data from the corresponding HARQ buffer and sends it on the available resources. UE_A will be notified about the automatic retransmission through DL CCH (downlink control channel, carrying the signalling grant) using the same HARQ process ID number, RV (redundancy version, which may be same RV or different RV than first transmission of punctured data block) and NDI (new data indicator set to indicate not new data) so UE_A knows that this is an automatic/pro-active retransmission (which implies that something was wrong with the previously transmitted data). UE_A will use the retransmission to restart decoding based on the newly received coded-bits. Although we note here that using a simple correlation analysis between the two received sets of coded bits (original one, which is partly punctured, and the automatically retransmitted version), UE_A may be able estimate the punctured data segments of the first transmission. Then the UE_A can get rid of those parts and use the rest of the first set of coded bits in order to improve chances of successful decoding for the second set of received coded bits.

As shown in FIG. 5B, UE_A data 508 is initially scheduled for transmission. Scheduled data 510 initially includes only UE_A data 520. UE_B data, which may be higher priority than UE_A data, arrives at 522, and causes the BS scheduler to puncture, at 524, the UE_A data in the scheduled data 510, and insert the higher priority UE_B data at 524 into the scheduled data 510 (or block of data that has been scheduled). Thus, instead of waiting for HARQ feedback (e.g., ACK or NACK) to use a standard HARQ retransmission at 532, the scheduler may perform a pro-active retransmission at 530 of the full data block that was punctured (to now be retransmitted, including the punctured data for UE_A).

The second approach (see FIG. 6) is to perform pro-active or automatic retransmission at 620, 650 of only the punctured parts of the data. This approach is desirable when only a small fraction of UE_A's data was punctured; meaning that retransmission of the whole data is not necessary and may be a waste of transmission resources. In this case, through the CCH (control channel, carrying the scheduling grant), UE_A may be explicitly informed through the scheduling grant that this is transmission contains only the data that were punctured in the previous transmission.

For example, as provided in control channel 640, if HARQ process ID, RV (redundancy version) and NDI (new data indicator) are kept the same in the automatic/pro-active retransmission compared to the original transmission, but the value of L_CRB (length of contiguous resource blocks, indicating a small resource block for retransmission of only punctured data) in RIV (resource indicator value) has decreased, UE_A will notice that a punctured data transmission is being partly retransmitted automatically or pro-actively. Then UE_A will look or search for an extra control message/channel 630 by default. The extra control message/channel 630 will inform the UE_A about the puncturing pattern that was imposed on the original transmission (e.g., indicating which parts of the original transmission were punctured, and/or which parts of original transmission were not punctured). UE_A may use this control information to replace indicated bits of the originally received block of data with the pro-actively transmitted punctured data bits.

Furthermore, as a result of the provision of automatic or pro-active HARQ retransmission for damaged data (according to any of the two embodiments, for example), there may be rules for the UE to postpone or cancel HARQ feed-back for the first transmission attempt, such that only relevant HARQ feedback information is carried over the air interface.

In case the UE is allowed to transmit "rich" HARQ feedback, one embodiment of the may allow the UE to transmit a "special NACK" with the information content corresponding to "got the automatic/pro-active retransmission scheduling grant and is processing this", such that the BS receives an indication that UE is "tuned into" the retransmission approach where BS will pro-actively retransmit at least the punctured data bits, and possibly may retransmit the full data block that was subject to reception errors or was damaged.

Figure 7:
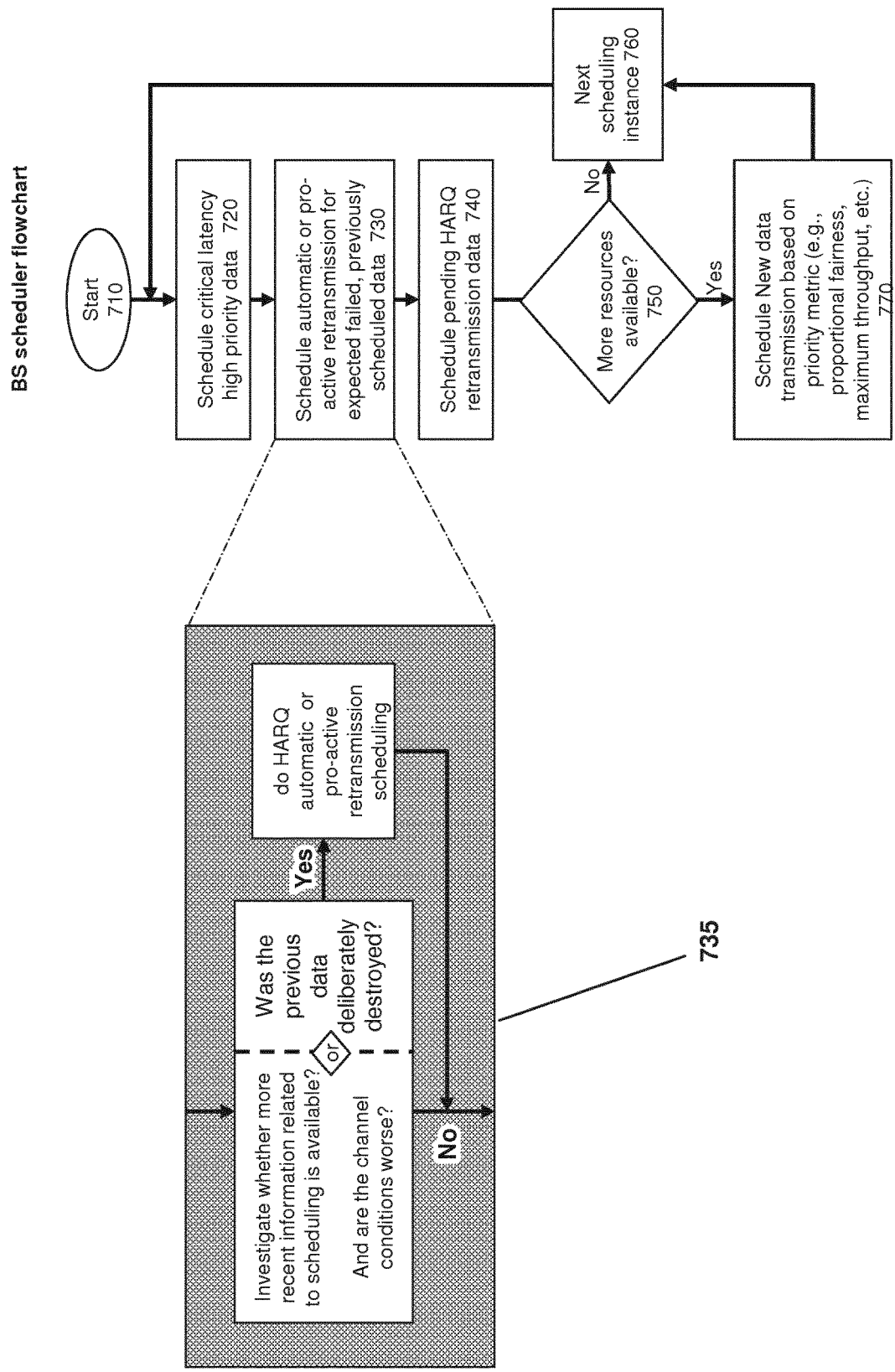
FIG. 7 is a flow chart illustrating operation of a base station (BS) scheduler according to an example implementation.

FIG. 7 is a flow chart illustrating operation of a base station (BS) scheduler according to an example implementation. At 710, the process begins. At 720, the scheduler schedules critical latency or high priority data for transmission. At 730 the scheduler schedules pro-active retransmission for expected failed or damaged (e.g., that is estimated to be subject to errors at the receiver), previously scheduled data. At 735, this may include determining if channel conditions or interference conditions for the channel have worsened (e.g., indicating that the reception of the data block may likely be subject to errors), or determining if the previously transmitted data was destroyed (e.g., punctured, such as to accommodate higher priority data). If either of these conditions is met in 735, then the scheduler performs a pro-active HARQ retransmission of at least a portion of the damaged data. At 740-770, the scheduler will schedule the transmission of lower priority data, including scheduling transmission of HARQ retransmission data at 740, and scheduling new data transmissions at 770 if more resources are available at 750, and otherwise, if no further resources are currently available at 760, to determine the next scheduling instance at 760.

Figure 8:
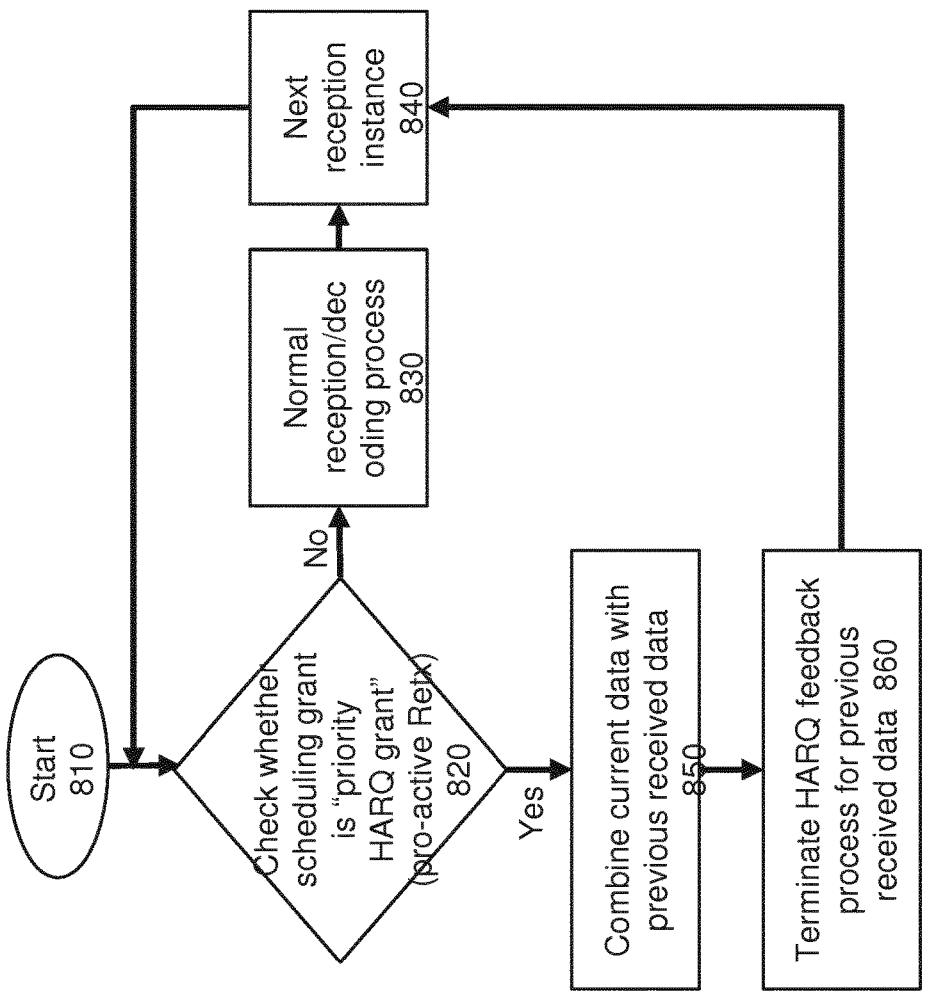
FIG. 8 is a flow chart illustrating operation of a user device (UE) or data receiver according to an example implementation.

FIG. 8 is a flow chart illustrating operation of a user device (UE) or data receiver according to an example implementation. The process starts at 810. At 820, the user device checks whether a scheduling grant is a HARQ grant for a pro-active or automatic retransmission of data. If the grant is simply a normal (a non-priority, or non-pro-active retransmission grant), then a normal reception and decoding process is followed at 830 and a next reception instance is identified at 840. However, if the scheduling grant is a priority grant or a grant for a pro-active or automatic retransmission (e.g., to include or retransmit damaged data, such as punctured bits), at 850, the pro-actively retransmitted data is combined at the user device with the previously transmitted data to obtain a combined data block, which may then be decoded by the user device, and then the HARQ feedback process is terminated for previously received data at 860.

Figure 9:
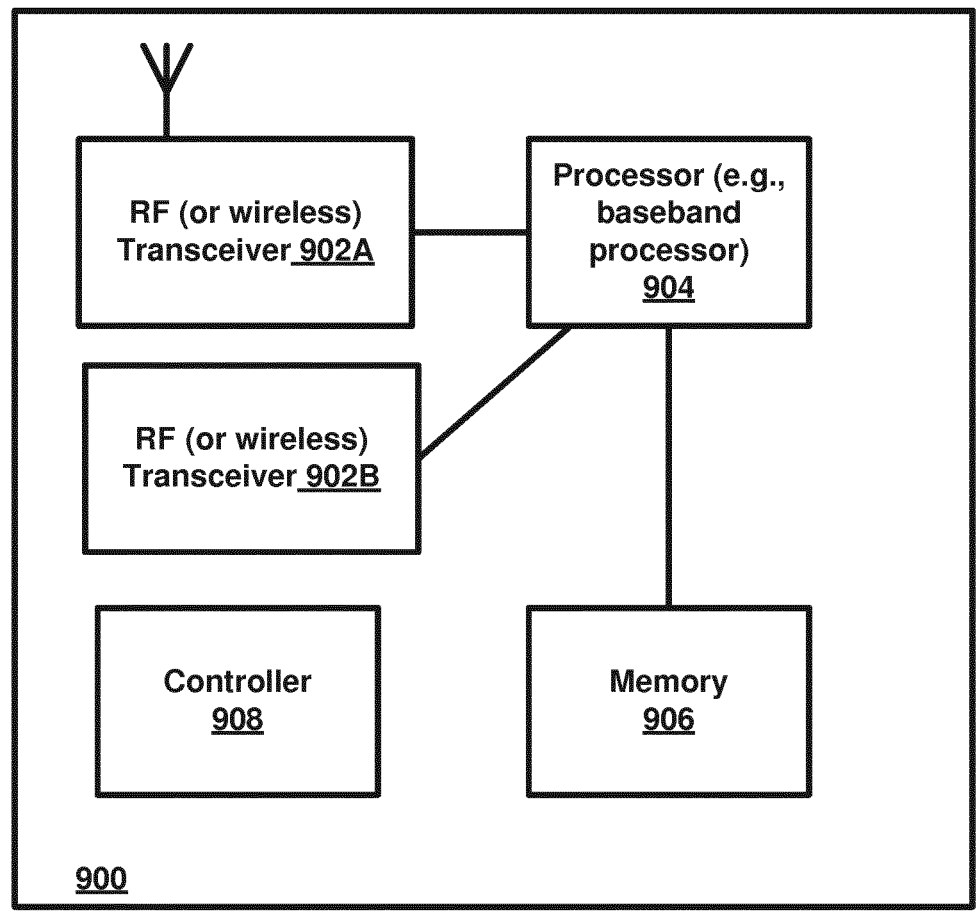
FIG. 9 is a block diagram of a node or wireless station (e.g., base station/access point or mobile station/user device/UE) according to an example implementation.

FIG. 9 is a block diagram of a wireless station (e.g., AP or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a first user device from a base station, a first data packet wherein a plurality of bits have been punctured;
   receiving, by the first user device from the base station, automatic retransmission information that indicates the first data packet has been punctured;
   receiving, by the first user device, a second data packet that includes at least the punctured plurality of bits;
   determining, by the first user device, whether the second data packet includes an original data transmission of the first data packet or only the plurality of bits have been punctured;
   in response to determining the second data packet includes the original data transmission,
     decoding, by the first user device, the second data packet in place of using the first data packet; and
   in response to determining the second data packet includes only the plurality of bits have been punctured,
     determining, by the first user device, a combined block of data by combining the punctured plurality of bits received via the second data packet with at least a portion of the first data packet, and
     decoding, by the first user device, the combined block of data.

2. The method of claim 1 wherein the receiving a first data packet comprises:
   receiving, by a first user device from a base station, a first data packet wherein a plurality of bits have been punctured and replaced with higher priority bits for a second user device.

3. The method of claim 1 wherein the second data packet including the plurality of punctured data bits are received via a priority hybrid ARQ (HARQ) retransmission for the transmission of previously punctured bits.

4. The method of claim 1, wherein in response to determining the second data packet includes the original data transmission, the method further comprising:
   estimating, by the first user device, the punctured data segments of the first data packet;
   discarding, by the first user device, the estimated punctured data segments from the first data packet; and
   decoding, by the first user device, the second data packet includes using the remaining segments of the first data packet.

5. The method of claim 1, wherein the first user device is notified of the automatic retransmission via a downlink control channel (DL CCH) carrying a signal grant.

6. The method of claim 5, wherein the automatic retransmission is communicated using a same hybrid ARQ (HARD) as the first data packet and a new data indicator indicates that the second data packet is not new.

7. The method of claim 5, wherein the automatic retransmission a same redundancy version as the first data packet.

8. The method of claim 5, wherein the automatic retransmission a different redundancy version as the first data packet.

9. The method of claim 1, wherein the automatic retransmission causes the first user device to restart decoding based on the second data packet.

10. An apparatus comprising at least one processor and at least one memory including computer instructions, when executed by the at least one processor, cause the apparatus to:
- receive, by a first user device from a base station, a first data packet wherein a plurality of bits have been punctured;
- receive, by the first user device from the base station, automatic retransmission information that indicates the first data packet has been punctured;
- receive, by the first user device, a second data packet that includes at least the punctured plurality of bits;
- determine, by the first user device, whether the second data packet includes an original data transmission of the first data packet or only the plurality of bits have been punctured;
- in response to determining the second data packet includes the original data transmission,
  - decode, by the first user device, the second data packet in place of using the first data packet; and
- in response to determining the second data packet includes only the plurality of bits have been punctured,
  - determine, by the first user device, a combined block of data by combining the punctured plurality of bits received via the second data packet with at least a portion of the first data packet, and
  - decode, by the first user device, the combined block of data.

11. The apparatus of claim 10 wherein the at least one processor and at least one memory including computer instructions, when executed by the at least one processor, cause the apparatus to receive a first data packet comprises the at least one processor and at least one memory including computer instructions, when executed by the at least one processor, cause the apparatus to:
- receive, by a first user device from a base station, a first data packet wherein a plurality of bits have been punctured and replaced with higher priority bits for a second user device.

12. The apparatus of claim 10 wherein the second data packet including the plurality of punctured data bits are received via a priority hybrid ARQ (HARQ) retransmission for the transmission of previously punctured bits.

13. The apparatus of claim 10, wherein in response to determining the second data packet includes the original data transmission, the computer instructions further comprising:
- estimating, by the first user device, the punctured data segments of the first data packet;
- discarding, by the first user device, the estimated punctured data segments from the first data packet; and
- decoding, by the first user device, the second data packet includes using the remaining segments of the first data packet.

14. The apparatus of claim 10, wherein the first user device is notified of the automatic retransmission via a downlink control channel (DL CCH) carrying a signal grant.

15. The apparatus of claim 14, wherein the automatic retransmission is communicated using a same hybrid ARQ (HARQ) as the first data packet and a new data indicator indicates that the second data packet is not new.

16. The apparatus of claim 14, wherein the automatic retransmission a same redundancy version as the first data packet.

17. The apparatus of claim 10, wherein the automatic retransmission causes the first user device to restart decoding based on the second data packet.

18. A non-transitory computer-readable storage medium comprising instructions stored thereon that, when executed by at least one processor, are configured to cause a computing system to:
- receive, by a first user device from a base station, a first data packet wherein a plurality of bits have been punctured;
- receive, by the first user device from the base station, automatic retransmission information that indicates which bits have the first data packet has been punctured;
- receive, by the first user device, a second data packet that includes at least the punctured plurality of bits;
- determine, by the first user device, whether the second data packet includes an original data transmission of the first data packet or only the plurality of bits have been punctured;
- in response to determining the second data packet includes the original data transmission,
  - estimate, by the first user device, the punctured data segments of the first data packet,
  - discard, by the first user device, the estimated punctured data segments from the first data packet, and
  - decode, by the first user device, the second data packet using the remaining segments of the first data packet; and
- in response to determining the second data packet includes only the plurality of bits have been punctured,
  - determine, by the first user device, a combined block of data by combining the punctured plurality of bits received via the second data packet with at least a portion of the first data packet, and
  - decode, by the first user device, the combined block of data.

19. The non-transitory computer-readable storage medium of claim 18 wherein instructions stored thereon that, when executed by at least one processor, are configured to cause the computing system to receive a first data packet comprises the at least one processor and at least one memory including computer instructions, when executed by the at least one processor, cause the computing system to:
- receive, by a first user device from a base station, a first data packet wherein a plurality of bits have been punctured and replaced with higher priority bits for a second user device.

20. The non-transitory computer-readable storage medium of claim 18 wherein the second data packet including the plurality of punctured data bits are received via a priority hybrid ARQ (HARQ) retransmission for the transmission of previously punctured bits.

* * * * *